United States Patent [19]

Hofland et al.

[11] Patent Number: 4,771,890
[45] Date of Patent: Sep. 20, 1988

[54] DISK RETAINER AND PACKAGING SYSTEM FOR OPTICAL DISKS

[75] Inventors: Robert M. Hofland; Philip D. Smith, both of Boulder, Colo.

[73] Assignee: International Business Machines Corporation, Armonk, N.Y.

[21] Appl. No.: 872,777

[22] Filed: Jun. 9, 1986

Related U.S. Application Data

[63] Continuation-in-part of Ser. No. 861,694, May 9, 1986, abandoned.

[51] Int. Cl.$^4$ .............................................. B65D 85/57
[52] U.S. Cl. ................................. 206/445; 206/309; 206/806; 211/40
[58] Field of Search .............. 206/316, 309, 311, 312, 206/313, 444, 806, 445, 303; 360/133; 211/40, 41, 80, 81, 113; 312/8-13

[56] References Cited

U.S. PATENT DOCUMENTS

| | | | |
|---|---|---|---|
| D. 263,222 | 3/1982 | Driscoll | D14/11 |
| 774,037 | 11/1904 | Burgi . | |
| 2,663,416 | 12/1953 | Hirsch | 206/62 |
| 2,785,797 | 3/1957 | Rice | 206/62 |
| 3,107,783 | 10/1963 | Corey et al. | 206/62 |
| 3,109,539 | 11/1963 | Turoff | 206/309 |
| 3,429,629 | 2/1969 | Cilia | 312/10 |
| 3,604,556 | 9/1971 | Schwartz | 206/1 R |
| 3,722,564 | 3/1973 | Croon | 150/39 |
| 3,825,112 | 7/1974 | Schumaker et al. | 206/310 |
| 4,076,119 | 2/1978 | Clarke | 206/309 |
| 4,327,831 | 5/1982 | Inaba et al. | 206/310 |
| 4,379,507 | 4/1983 | Llabres | 206/444 |
| 4,535,888 | 8/1985 | Nusselder | 206/444 |

FOREIGN PATENT DOCUMENTS

| | | | |
|---|---|---|---|
| 0167167 | 1/1986 | European Pat. Off. | 206/309 |
| 3027804 | 2/1982 | Fed. Rep. of Germany | 206/316 |

Primary Examiner—Jimmy G. Foster
Attorney, Agent, or Firm—Francis A. Sirr

[57] ABSTRACT

A retainer for holding and protecting an optical disk is molded from plastic, to form a thin, flat, rectangular base member having a shallow rectangular cavity in the front surface thereof. A shallow circular cavity is centrally located within the rectangular cavity. The disk is resiliently held within the circular cavity, and can be removed by finger lifting. The retainer's top edge includes a hook recessed into its flat top edge. This hook allows the retainer to be vertically hung from, and perpendicular to, a horizontal storage rod. The retainer includes short, spaced posts located within the top portion of the rectangular cavity. A flat storage envelope mounts on these posts, to overlay the disk's exposed surface. The two external, vertically extending side walls of the base each include a flat, protruding, label surface located at the center of the side wall. Two flat box shaped containers are provided. One container holds a single retainer. Another container holds two disk retainers, or in the alternative a single retainer, a dummy retainer and relatively thick material auxiliary to use of the disk. When a retainer is mounted in a container, its hook is concealed, but the retainer's label surfaces protrude through openings provided in the container.

22 Claims, 9 Drawing Sheets

DISK RETAINER AND PACKAGING SYSTEM FOR OPTICAL DISKS

REFERENCE TO PRIOR APPLICATION

This application is a continuation-in-part of prior application Ser. No. 861,694, filed May 9, 1986, abandoned.

FIELD OF THE INVENTION

This invention relates to special receptacles or packages for disk shaped objects, such as an optical disk.

BACKGROUND OF THE INVENTION

While the prior art provides packages for storing and protecting flat disk shaped objects, such as optical disks, none of these packages provided a large number of functions in a single package construction and arrangement, as is accomplished by the present invention. Prior art packages of this general type are shown in U.S. Pat. Nos. 2,663,416 and 3,825,112, for example.

Optical disks, when not in use, should be placed in a container which protects the data-containing surface of the disk, and this function has been addressed in the prior art. U.S. Pat. Nos. 2,785,797, 4,076,119 and 4,379,507 are exemplary of this type of prior art device.

Another convenient feature provides for ease of manual removal of the disk from its storage compartment. U.S. Pat. No. 2,785,797 is of interest in that it shows the prior art expedient of providing a finger recess 21 to aid in manual removal of the record. This feature for aiding in the removal of the object is also addressed in U.S. Pat. Nos. 774,037 and 3,604,556.

Another convenient prior art feature, found in a different form in the present invention, is shown in aforesaid U.S. Pat. No. 3,604,556, where a tape cassette is contained in its storage cavity by operation of overhanging flanges 20 and 21. In order to remove the cassette, manual force is applied to one edge of the cassette, using finger aperture 19, and the cassette is moved to the side, against the bias force of spring 22a. This moves one edge of the cassette out from under flange 21, whereupon the cassette can be lifted upward and removed from its storage cavity.

Optical disks which contain educational course material, for example, are usually accompanied by a pamphlet, manual or magnetic floppy disk which assists the optical disk user. When the optical disk is not in use, it is desirable that a convenient storage compartment be provided whereby such course material can be stored with the optical disk, so that these associated materials do not become separated. This need has been addressed by the prior art. U.S. Pat. Nos. 3,107,783, 3,722,564, 4,327,831 and 4,535,888 are exemplary of this type of prior art. These prior art devices do not, however, accomplish this function in a compact and user friendly manner.

The prior art means of storing a container and its disk included use of a hanger or hook whereby the disk is stored with its flat plane hanging vertically. U.S. Pat. No. 3,429,629 and U.S. Des. Pat. No. 263,222 are exemplary of this type of prior art. Other prior art containers include stacking ridges whereby the containers can be stacked with the disk's flat plane horizontal. U.S. Pat. No. 4,379,507 is exemplary of this prior art feature. The prior art, however, does not provide for both of these options in single construction and arrangement.

The present invention provides these and other features, in a single, compact and user friendly construction and arrangement, thereby providing greater utility than is found in the prior art.

SUMMARY OF THE INVENTION

The present invention provides a disk retainer, and storage containers therefor.

The disk retainer is constructed and arranged to be either hung from a storage rack, or placed in a closed container(s). The retainer is formed of a dimensionally stable material, such as plastic. It is thin, so as to occupy limited space. Yet, its construction and arrangement also provides storage of auxiliary material by way of a removable envelope which hangs within a rectangular cavity formed in the retainer. A circular cavity is formed under the rectangular cavity, and the disk is removably mounted in this circular cavity. In this way, the aforesaid envelope overlies and protects the exposed side of the disk.

The storage container of the present invention is constructed and arranged to hold and latch a disk retainer therein, while at the same time providing a means whereby the retainer's identification indicia remains visible to the user. A modified storage container holds two retainers, or alternatively holds one retainer and provides a filler wall such that the second retainer's space can be occupied by pamphlets, etc.

The details of construction of the present invention, to be described hereinafter, provide a retainer and containers therefor, which are easy to use, while at the same time affording maximum protection to the disk.

THE INVENTION

Throughout the following description of the present invention, the terms top and bottom, front and back, have been arbitrarily defined, and are not to be considered as a limitation on the invention.

The retainer of the present invention is made up of a base member 11 having a flat, thin, rectangular shape.

Without constituting a limitation on the present invention, when the retainer is used with an optical disk about 11¾ inches in diameter, the retainer itself is about 14½ inches high, 12 inches wide at the location of its label portions, 11½ inches wide adjacent thereto, and ¾ inch thick.

Base member 11 is preferably formed of a dimensionally stable plastic. Since base member 11 is somewhat longer than it is wide, the base member's long axis can be considered to extend between a top edge 12 and a bottom edge 13, whereas its shorter axis extends between side edge 14 and side edge 15.

Figure 1:
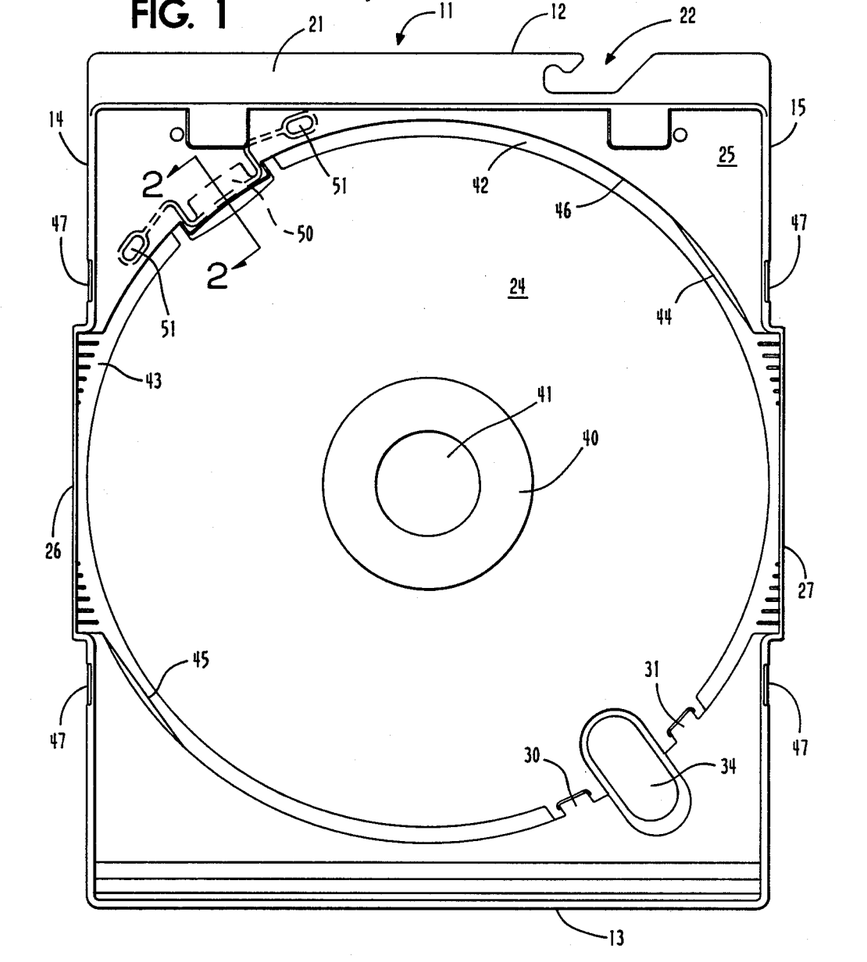
FIG. 1 is a front view of the present invention, showing the retainer's circular cavity without a disk mounted therein.
Figure 3:
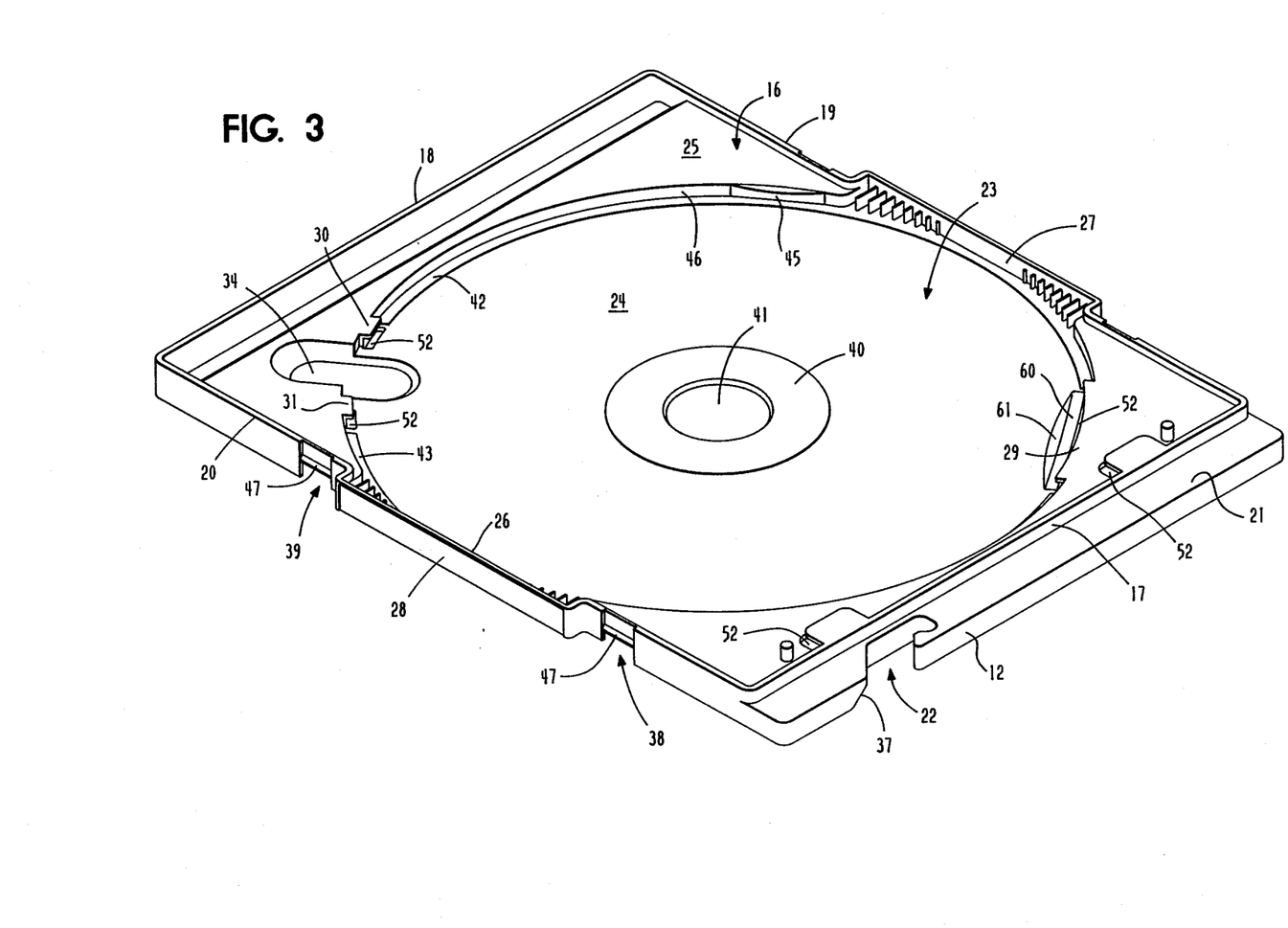
FIG. 3 is a front perspective view of the device of FIG. 1.
Figure 4:
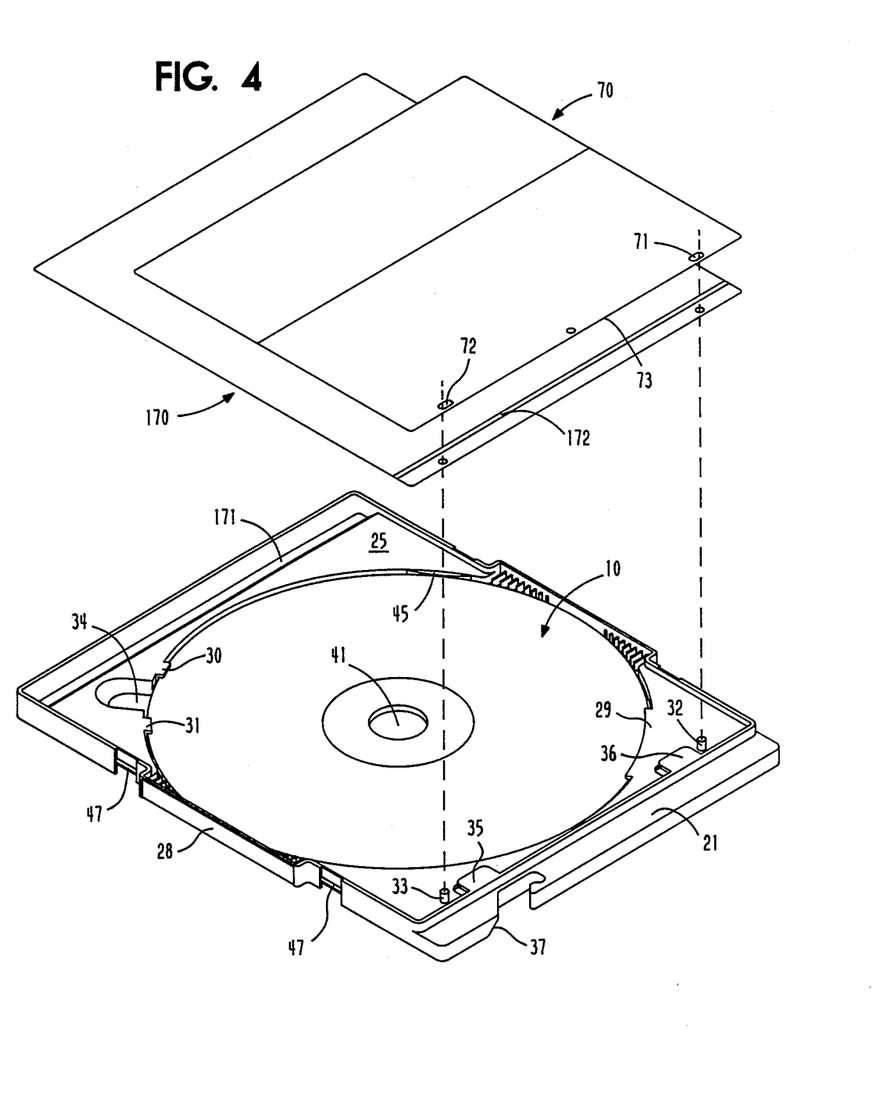
FIG. 4 is a front perspective view of the device of FIG. 1, showing an optical disk mounted therein, and showing the storage envelope which stores flat material auxiliary to use of the disk.

The major portion of the front side of base member 11 (i.e., the side shown in FIGS. 1, 3 and 4) comprises a shallow rectangular cavity 16, best seen in FIGS. 3 and 4.

The construction of the back side of base member 11 is not critical, and can, for example, comprise a flat surface. However, for ease of injection molding and subsequent material curing the back surface of base member 11 is preferably contoured inwardly so as to provide a material thickness of about 2 millimeters (mm). Also, preferably the back side of the retainer includes an opening (not shown) which enables spring 50 to be mounted upon bosses 51 (see FIG. 1), which bosses are molded into the base member. Spring 50 engages the edge of the optical disk, and operates to hold the disk securely within its circular cavity, as will be described. In addition, and for ease of molding, the retainer is formed with openings 52 (see FIG. 3) which extend from the retainer's back surface to its front surface in the area under the various tabs (to be described) which are formed in the retainer.

Rectangular cavity 16 is defined by an encircling wall of a short, uniform height. This wall (see FIG. 3) is made up of the interconnection of top wall 17, bottom wall 18, three-part side wall 19 and three-part side wall 20. Wall portions 18, 19 and 20 are contiguous with the bottom and side edges of base member 11, respectively.

Each of these side walls includes two recessed areas 38 and 39 within which is provided an extending ridge 47. These ridges cooperate with spring means which are located in the containers into which the retainer may be place for carrying in a briefcase and the like, as will be described.

Top wall 17 is spaced from the base member's top edge 12, and the wall extends in a direction parallel to this edge. Thus, a portion 21 of the base member extends beyond the confines of the wall which defines rectangular cavity 16.

A hanging hook 22 is formed as a recess into this portion 21 of the base member. This hook is used to store the base member, and its optical disk 10, as the base member hangs from a horizontally extending rod. When so hung, the disk and the base member hang with their flat planes extending vertically.

This portion of the base member includes an inclined surface 37 (see FIG. 3) which enables finger engagement with a quasi back side of the retainer, so that the retainer may be lifted out of the container(s) to be described, thereby overcoming the container's spring arrangement that operates to hold the retainer in its container.

The specific construction and arrangement shown for hook 22 is of the type, for example, known by the brand name Wright Line, and cooperates with storage cabinets sold by the Wright Line Company.

A shallow, circular cavity 23 (FIG. 3) is formed generally in the center of rectangular cavity 16. Cavity 23 includes a flat floor 24 that is parallel to flat floor 25 of rectangular cavity 16. The diameter of cavity 23 is only somewhat greater than the diameter of disk 10, and is of a depth only somewhat greater than the thickness of disk 10. Thus, when the disk is located in cavity 23 (FIG. 4), the exposed disk surface is parallel to floor 25, and this exposed disk surface is located only a short distance below the plane of floor 25.

When the disk is in position in circular cavity 23, its center nondata label portion rests on the centrally located raised, flat surface 40 which is formed into the floor of cavity 23. Surface 40 is parallel to floor 24. A finger recess 41 is recessed into the center of this raised portion. This recess comprises a means whereby a user can lift the disk out of the circular cavity after the disk has been released from retaining means yet to be described.

The outer edge of circular cavity 23 includes narrow raised surfaces 42 and 43 whose height above cavity floor 24 is generally the same as the height of central portion 40. Raised surfaces 42 and 43 are parallel to floor 24 and support disk 10 at its outer circumference nondata portion.

The circular cylinder annular wall 46 of cavity 23 extends perpendicular to cavity floor 24. This annular wall includes two disk guide surfaces 44 and 45 (best seen in FIG. 1) which are located generally on a first diagonal axis of rectangular cavity 16. As best seen in FIG. 3, the top of each guide surface is inclined downward from floor 25 toward floor 24. This incline aids in guiding the disk down into circular cavity 23, should the disk be slightly misaligned during insertion into cavity 23.

Guide surfaces 44 and 45 are spaced only somewhat greater than the diameter of disk 10, and thus they operate to prevent shifting of the disk along this diagonal axis. As will be apparent, shifting of the disk along the orthogonal diagonal axis is prevented by spring 50.

It can now be seen that the present invention provides a very compact construction and arrangement due to the fact that the thickness of the retainer that holds disk 10 is only somewhat greater than (1) the sum of the depth of rectangular cavity 16 (which depth is defined by the height of the wall 17, 18, 19 that encircle and define the cavity), and (2) the depth of circular cavity 23.

The long-axis spacing of top wall 17 and bottom wall 18 is greater than the diameter of disk 10, but the short-axis spacing of the major portions of side walls 19, 20 is less than this diameter. In order to accommodate disk 10, the side walls each include offset wall portions 26 and 27 which are located generally in the center of each side wall. These offset wall portions are spaced apart a distance only somewhat greater than the diameter of disk 10, so as to accommodate the external circumference of the disk within the cavity wall. In addition, offset wall portions 26 and 27 each include an external flat surface 28 to which a name plate or the like is mounted. This label or name plate carries indicia identifying the data or program content of disk 10.

As will be apparent, the construction and arrangement of the present invention allow this indicia to be exposed and readable both when the retainer is hanging on a storage rack, or when the retainer is stored in one of the cover containers yet to be described.

Floor 25 of rectangular cavity 16 includes three extending tabs 29, 30 and 31 which overhang circular cavity 23 a short distance. These three tabs are located generally on the other diagonal axis of rectangular cavity 16, and define diametrically opposed tab means whereby disk 10 is removably mounted in cavity 23. Tab 29 conceals a spring 50 (see FIGS. 1 and 2) which engages and is compressed by the edge of the disk when the disk is manually placed in circular cavity 23. Thus, the disk is placed in cavity 23, as shown in FIG. 4, by first manually placing an edge of the disk under tab 29. The disk is then pushed toward the tab, as spring 50 is compressed. The opposite edge of the disk can now be pushed down into cavity 23. When the disk is thereafter released, its edge is spring biased to move to a position under tabs 30 and 31. The force of spring 50 prevents shifting of the disk along this diagonal axis of rectangular cavity 16. Thus, the disk is firmly imprisoned in circular cavity 23.

A finger recess 34 is formed into the floor of rectangular cavity 16 between tabs 30 and 31. Recess 34 extends to a depth only somewhat greater than the floor of circular cavity 23, and thereby facilitates removal of disk 10 by first moving the disk against the force of spring 50, and then lifting up on the edge of the disk.

Figure 2:
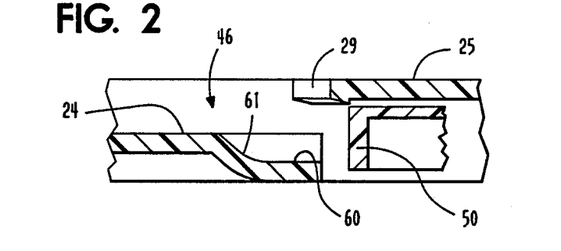
FIG. 2 is a partial section view of the device of FIG. 1, taken along the line 2—2 thereof.

FIG. 2 shows a clearance surface which is recessed into floor 24, and which aids in removal of the disk. This clearance surface is formed by circular cylinder sections 60 and 61. When the disk is manually lifted from cavity 23, by use of finger recess 34, the edge of the disk which is located under tab 29 is provided with clearance between tab 29 and floor 24, to prevent possible damage to the edge of the disk.

FIG. 4 shows a flat, flexible, transparent plastic envelope 70 which is of a size to fit within the wall which makes up rectangular cavity 16. This envelope includes holes 71 and 72 which are formed adjacent the envelope's top edge 73. The envelope also includes one or more openable pockets into which material related to the data or program content of disk 10 are removably inserted. Exemplary material to be placed in these pockets are floppy magnetic disks, manuals and a variety of thin flat objects.

Envelope 70 does not extend the full length of the retainer's rectangular cavity 16. A longer envelope 170 is also shown. This envelope, which extends the full length of cavity 16, is also constructed and arranged to hold flat objects which are used with the disk. In order to facilitate easy removal of long envelope 170, the rectangular cavity's floor 25 includes an elongated finger slot 171.

Cavity 16 includes a pair of extending posts 32 and 33 which are spaced apart the same distance as holes 71 and 72 in envelope 70. Posts 32 and 33 do not extend above the plane which is defined by the top surface of cavity wall 17, 19, 19, 20. A pair of spaced tabs 35 and 36 are formed as extensions of top wall portion 17. These tabs extend parallel to cavity floor 25, and the bottom surface of each tab is spaced therefrom. These tabs are located so as not to overhang posts 32 and 33. Thus, the flexible upper edge 73 of flexible envelope 70 can be threaded under tabs 35 and 36, as the envelope is mounted on posts 32 and 33. In this way, the envelope is removably imprisoned on posts 32 and 33.

The height of posts 32 and 33 are such that more than one envelope can be placed thereon. If desired, a stiffening and/or reinforcing strip 172 can be placed along the top edge of the envelope.

FIGS. 5 through 10 show various views of the two containers of the present invention. As stated previously, these containers allow a disk(s) and its retainer(s) to be carried in a briefcase and the like, while at the same time completely protecting the disk(s). The containers of the present invention are preferably made of the same quality plastic material as is the retainer.

For the exemplary size disk described above, the container of FIG. 9 is about 14¾ inches high and 12 inches wide. The container of FIG. 5, which holds two retainers, is about 1⅜ inches thick; whereas, the container of FIG. 7, which holds one retainer, is somewhat thinner.

Figure 5:
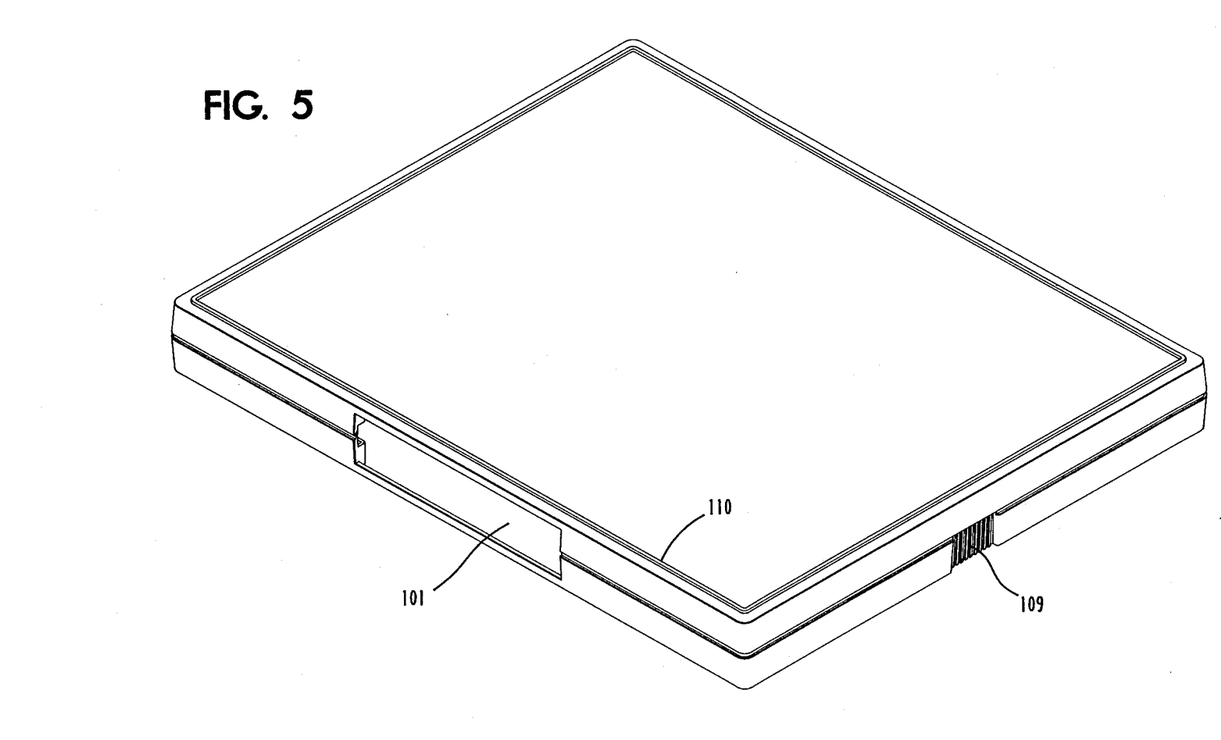
FIG. 5 is a perspective view of a container for holding two of the FIG. 1 retainers.

FIG. 5 is a perspective view of a container 100 for holding two of the above described retainers, their disk and storage envelopes. Alternatively, one retainer can be placed in one side of this container, and a thin filler member (not shown) can be placed in the other side of the container. This filler member is in the form of a cover for this other side's rectangular cavity, and enables this cavity to hold other flat material, such as thicker books, pamphlets, and the like. The container of this figure does not contain a retainer, and thus its side openings 101 (one on each side thereof) are not closed by the retainers' flat name plate surface 28 (see FIG. 8 for a showing of a retainer in place in a container half) to which a name plate or the like is attached. As mentioned, this name plate serves to identify the disks being held within the retainer.

Figure 7:
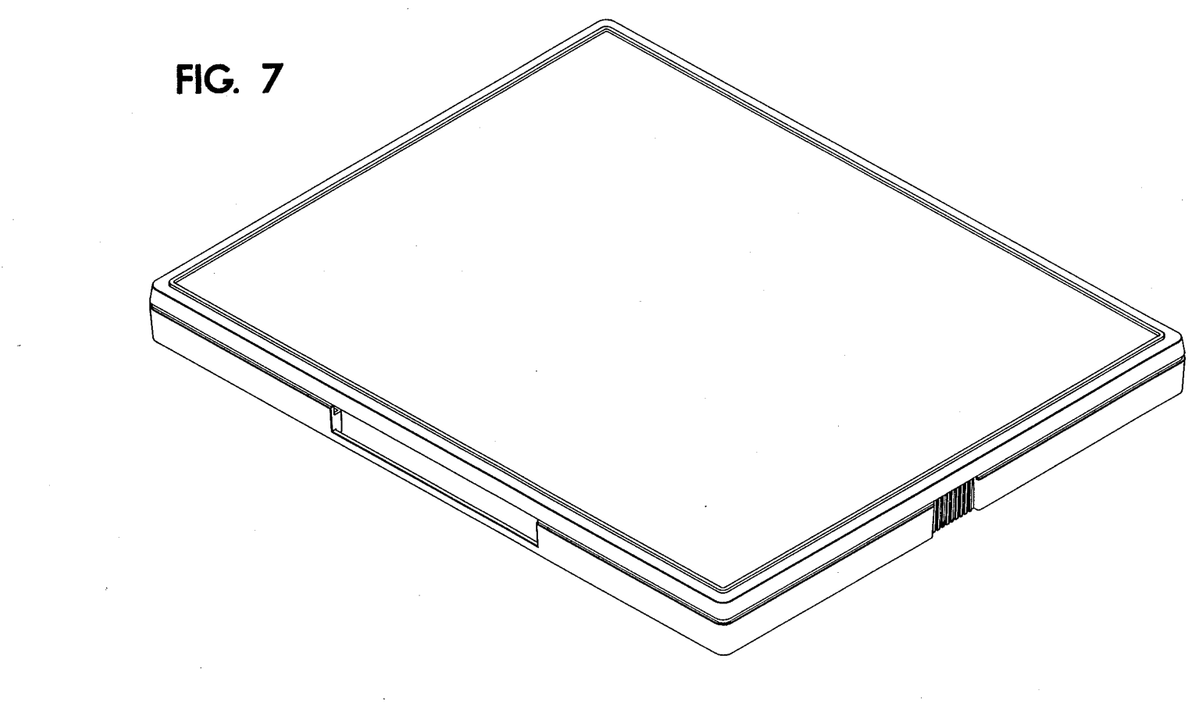
FIG. 7 is a perspective view of a container for holding one of the FIG. 1 retainers.

The containers of FIGS. 5 and 7 both include a molded catch portion 109 which can be flexed inward to release this catch from a tab which is molded into the top half of the container. In this way, the two halves of the container can be separated, and the container can be opened to expose the disk retainers held therein. In addition, each container includes an upper stacking ridge 110 and a lower stacking ridge (not shown). These stacking ridges are about 1/16 inch high, and are of relatively different boundary sizes (the boundary length of the lower stacking ridge is the smallest), so that when one container is set on top of another container, the ridges nest one within the other, and the stack of containers is provided with sidewise stability. An additional feature of the present invention is that upper stacking ridge 110 closely holds a retainer therein.

Figure 6:
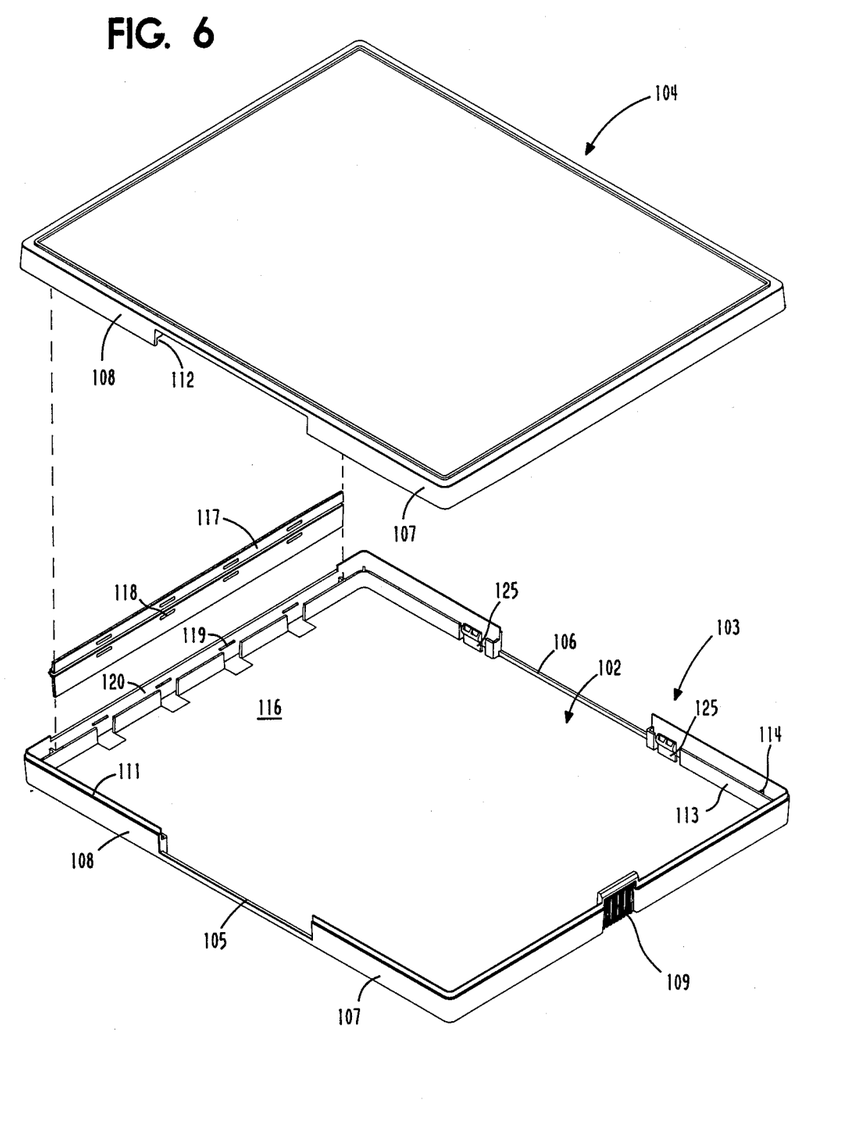
FIG. 6 is an exploded view of the container of FIG. 5, showing the container's two cover portions, and the plastic hinge that connects the two cover portions.

FIG. 6 is an exploded view of the container of FIG. 5. This figure shows the internal cavity 102 of one of the container halves 103. The other container half 104 is of identical internal construction, with the exception of the mating latch tabs carried by the container halves, and the mating construction 111, 112 of the walls which surround the container halves (see FIG. 6). Each half includes two oppositely located cutout wall portions 105 and 106 which enable the disk retainer's two name plate portions 28 to extend through the container side walls, so that the retainer's indicia surface 28 is contiguous with the external surfaces 107 and 108 of each side wall. The bottom half 103 includes an upstanding wall portion 111, about ⅛ inch high, which mates with an internal groove 112 formed in the top half of the container.

Figure 10:
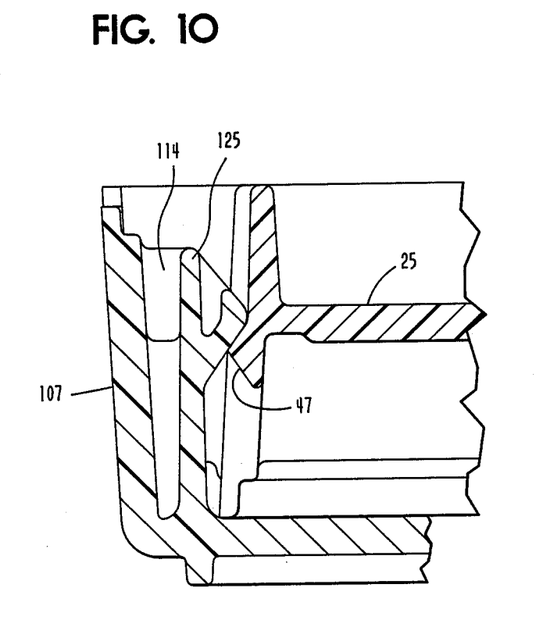
FIG. 10 is a partial section view of a retainer and a container, and shows the means whereby the retainer is latched into the container's internal cavity.

As best seen in FIG. 10, the major portion of the container's internal peripheral edge, in both the top and bottom half of the container, includes a series of open top stiffening chambers which are formed by an internal wall 113 and a number of spacer walls 114. A plastic hinge 117 connects the upper and lower half. This spring is mounted to the halves by way of open slots 118 which snap onto tabs 119 which are molded into the interior vertical surface 120 of the container half.

Figure 8:
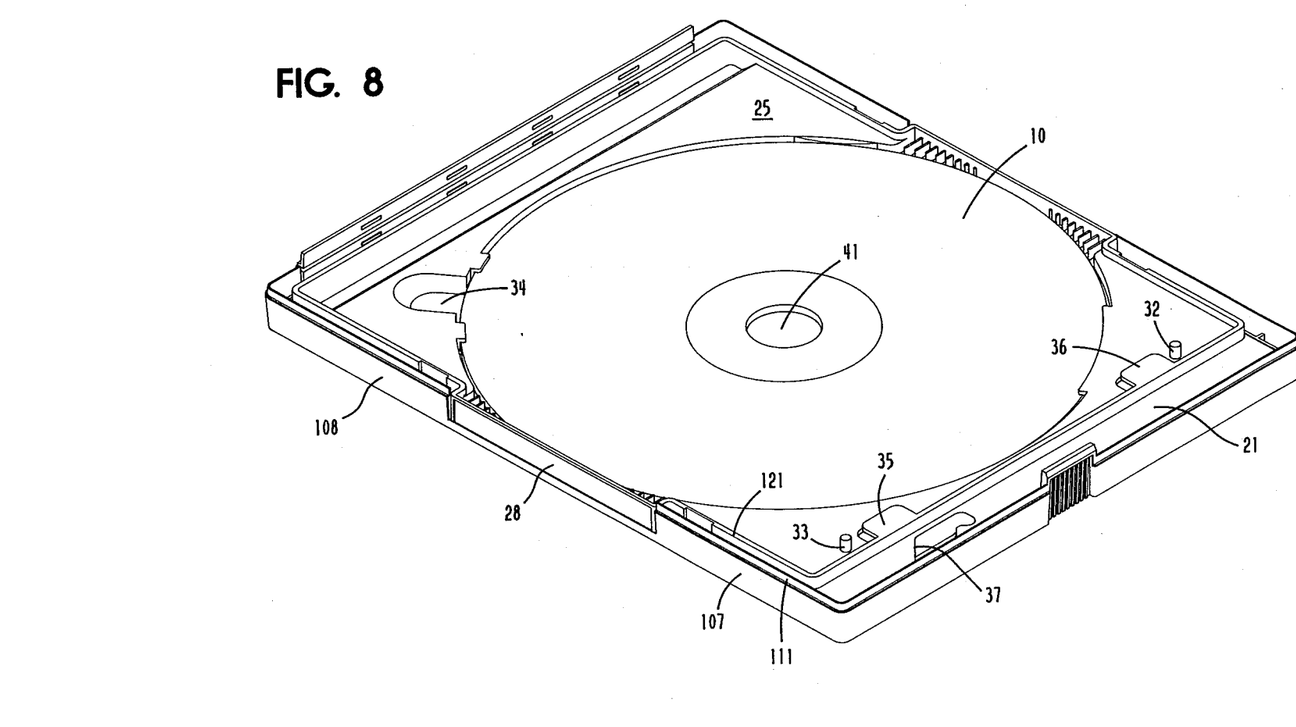
FIG. 8 is a perspective view of the bottom half of either the container of FIG. 5 or the container of FIG. 7, and shows a retainer, and its disk, latched therein.

FIG. 8 shows a retainer and its disk 10 located within a container half. In this position of the retainer, the plane defined by the top 121 of the retainer's exterior wall lies about ⅛ inch below, and parallel to, the plane defined by the top of the container's wall peripheral portion 111. The retainer's label surface 28 now closes the opening 105 in the side of the container half, and surface 28 forms a continuation of the container's exterior side walls 107 and 108 (also see FIG. 9).

Figure 9:
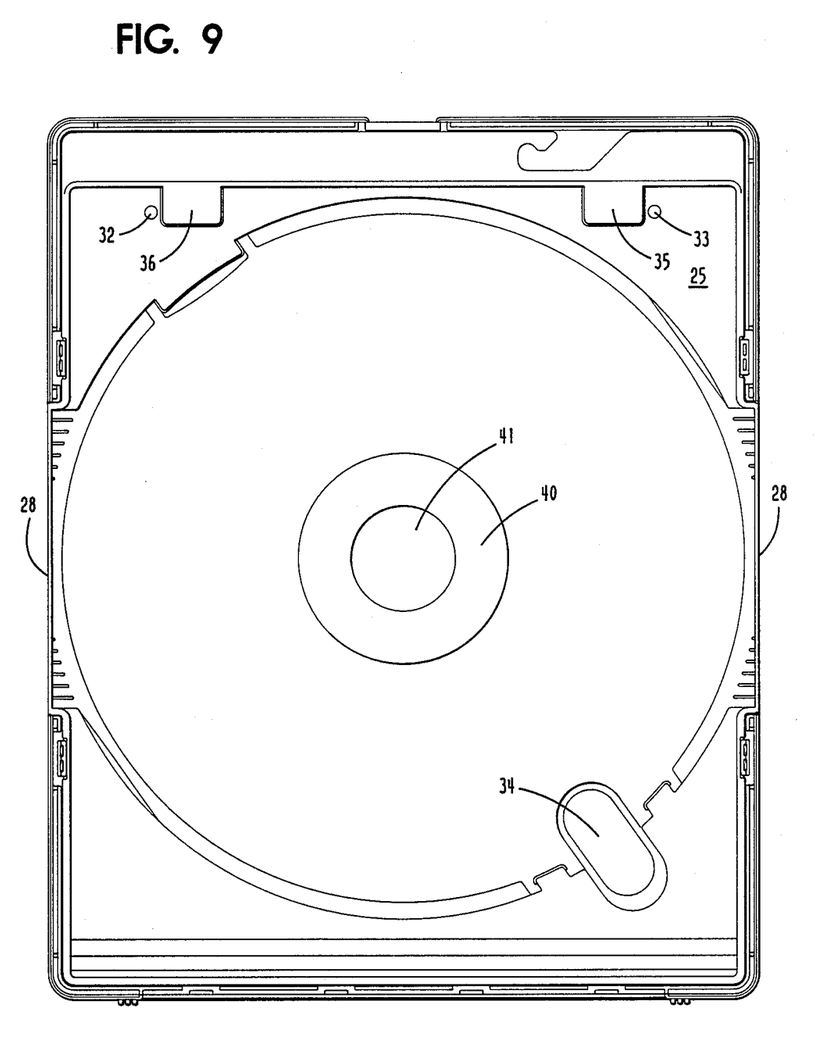
FIG. 9 is a plan view of a retainer, absent its disk, latched to a container portion.

Note also that due to the symmetry of the retainer, the retainer can be inserted into the container as shown in FIGS. 8 and 9, or the retainer can be rotated 180° from this position, and can then be inserted into the container.

FIG. 10 shows one of the four above-mentioned extending ridges 47 which are carried by the retainer. Each of these ridges cooperates with a spring means in the form of a flexible molded plastic blade 125 (also see FIG. 6) which stands up from the bottom of the container half. Once the container is pushed down into the container half, it is retained therein by the latching of blade 125 and ridge 47, as shown in FIG. 10. In order to release the disk retainer from the container, a finger is inserted under the retainer's inclined surface 37 (see FIG. 8), and the retainer is pulled upward, thereby releasing the ridges 47 from blades 125.

While this invention has been particularly shown and described with reference to a preferred embodiment thereof, it will be understood by those skilled in the art that various changes in form and detail may be made therein without departing from the spirit and scope of this invention.

What is claimed is:

1. A retainer for holding and protecting a thin, flat disk, comprising:
   a flat, relatively thin, rectangular shaped base member having top, bottom and side edges, a long axis which extends between said top and bottom edges, a shorter axis which extends perpendicular to said long axis, and a flat planar surface which is bounded by
   a top wall which is spaced from and parallel to the top edge of said base member,
   a bottom wall which is parallel to said top wall and is contiguous with the bottom edge of said base member, and
   two opposite side walls which connect to said top and bottom walls and are contiguous with the side edges of said base member,
   said walls being of generally equal height and defining a shallow rectangular cavity having a flat floor and first and second diagonal axes,
   a portion of said base member being located between said top wall and said top edge of said base member,
   hook means formed as a recess into said portion of said base member which is between said top wall and the top edge of said base member, said hook means enabling said base member to be hung from its top edge, with the floor of said rectangular cavity generally vertical,
   a shallow, circular cavity formed generally in the center of the floor of said rectangular cavity, said circular cavity having a flat floor which is generally parallel to the floor of said rectangular cavity, said circular cavity being slightly greater in diameter than the disk, and said circular cavity being of a depth such that when the disk is positioned in said circular cavity the exposed surface of the disk is located a short distance below the floor of said rectangular cavity,
   the long axis spacing between said top and bottom walls being greater than the diameter of the disk,
   the shorter axis spacing of a major portion of said side walls being less than the diameter of the disk, and each of said side walls including a centrally located offset wall portion, said offset wall portions being spaced apart a greater distance so as to accommodate the external circumference of the disk within the wall, said offset wall portions having flat external wall surfaces which are parallel to each other,
   and disk identification indicia contained on at least one of said external wall surfaces.

2. The retainer of claim 1 wherein the disk includes a centrally located aperture, the retainer including:
   a centrally located, slightly raised portion in the floor of said circular cavity upon which the central nonoperative portion of the disk rests,
   an annular raised edge portion in the floor of said circular cavity upon which the annular nonoperative portion of the disk rests, and
   a finger recess located in said center raised portion, which recess is accessible through the disk's aperture.

3. The retainer of claim 1 including:
   a centrally located, slightly raised portion in the floor of said circular cavity upon which the central nonoperative portion of the disks rests,
   an annular raised edge portion in the floor of said circular cavity upon which the annular nonoperative portion of the disk rests,
   three short tabs formed as extensions of the floor of said rectangular cavity to overhang said circular cavity generally along said first diagonal axis of said rectangular cavity, a first of said tabs being located at a first position about the circumference of said circular cavity, and the other two of said tabs being spaced from each other by a short circumferential distance and being located at a second position diametrically opposite said first tab,
   spring means formed adjacent the wall of said circular cavity under said first tab,
   whereupon a disk may be manually mounted in said circular cavity by first inserting its edge under said first tab, then pushing the disk toward the wall of said circular cavity to thereby compress said spring means, and then pushing the disk down into said circular cavity, whereupon the peripheral nonoperative portion of the disk is captured under said tabs, and
   a shallow finger recess formed in the floor of said rectangular cavity, at a location between said other two tabs, the depth of said finger recess being greater than the depth of said circular cavity, said finger recess thereby facilitating removal of the disk from said circular cavity.

4. The retainer of claim 3 wherein the disk includes a centrally located aperture, and
   a finger recess located in said centrally located, slightly raised portion in the floor of said circular cavity, said finger recess being accessible through the disk's aperture.

5. The retainer of claim 4 including a depressed surface formed in the floor of said circular cavity, under said first tab, to provide clearance space for the edge of the disk immediately under said first tab during insertion and removal of the disk from said circular cavity.

6. The retainer of claim 3 including:
   a pair of protruding surfaces formed in the wall of said circular cavity, generally along said second diagonal axis of said rectangular cavity, said protruding surfaces reducing the diameter of said circular cavity to a dimension about equal to the diameter of the disk, to thereby confine the disk against movement by entrapment of the disk along the two diagonal axes of said rectangular cavity.

7. The retainer of claim 6 including a depressed surface formed in the floor of said circular cavity, under said first tab, to provide clearance space for the edge of the disk immediately under said first tab during insertion and removal of the disk from said circular cavity.

8. The retainer of claim 1 including:
   a thin, flexible envelope having a pair of spaced holes formed adjacent the top edge thereof, said envelope being adapted to hold thin objects auxiliary to the disk,
   a pair of spaced posts extending from the floor of said rectangular cavity, and located adjacent said top wall, said posts being spaced apart a distance equal to the spacing of the holes in said envelope and extending from said floor a distance no greater than the height of said top wall, and
   a pair of spaced tabs extending from said top wall, and overhanging said rectangular cavity, but not overhanging said posts, said tabs extending generally parallel to the floor of said rectangular cavity,
   whereby said envelope may be mounted on said posts with portions of said envelope loosely imprisoned under said tabs.

9. The retainer of claim 3 including:
   a thin, flexible envelope having a pair of spaced holes formed adjacent the top edge thereof, said envelope being adapted to hold thin objects auxiliary to the disk,
   a pair of spaced posts extending perpendicular from the floor of said rectangular cavity, and located adjacent said top wall, said posts being spaced apart a distance equal to the spacing of the holes in said envelope and extending from said floor a distance no greater than the height of said top wall, and
   a pair of spaced tabs extending from said top wall, and overhanging said rectangular cavity, but not overhanging said posts, said tabs extending generally parallel to the floor of said rectangular cavity,
   whereby said envelope may be mounted on said posts with portions of said envelope loosely imprisoned under said tabs.

10. The retainer of claim 6 including:
    a thin, flexible envelope having a pair of spaced holes formed adjacent the top edge thereof, said envelope being adapted to hold thin objects auxiliary to the disk,
    a pair of spaced posts extending perpendicular from the floor of said rectangular cavity, and located adjacent said top wall, said posts being spaced apart a distance equal to the spacing of the holes in said envelope and extending from said floor a distance no greater than the height of said top wall, and
    a pair of spaced tabs extending from said top wall, and overhanging said rectangular cavity, but not overhanging said posts, said tabs extending generally parallel to the floor of said rectangular cavity,
    whereby said envelope may be mounted on said posts with portions of said envelope loosely imprisoned under said tabs.

11. The retainer of claim 10 including a depressed surface formed in the floor of said circular cavity, under said first tab, to provide clearance space for the edge of the disk immediately under said first tab during insertion and removal of the disk from said circular cavity.

12. The retainer of claim 8 wherein said envelope is of substantially the same size as said rectangular cavity, and wherein the floor of said rectangular cavity includes a finger recess formed therein adjacent said bottom wall, said finger recess facilitating removal of said envelope.

13. The retainer of claim 12 including a stiffening strip formed on the top edge thereof.

14. The retainer of claim 1 including a container for holding and protecting said retainer, said container comprising:
    a flat rectangular floor member of a size substantially equal to the size of said retainer,
    a wall encircling said floor member, said wall being made up of top, bottom and side segments, and said wall being of a height only somewhat greater than the thickness of said retainer,
    openings in the side segments of said wall, said openings accommodating the offset wall portions of said retainer, such that said disk identification indicia remains visible when said retainer is in said container, and
    a cover for said container cooperating with said wall.

15. The combination retainer and container of claim 14, wherein the offset wall portions in the side walls of said retainer, and the openings in the side walls of said container, are centrally located, such that said retainer can be inserted into said container with either top-to-top or top-to-bottom orientation.

16. The combination retainer and container of claim 14 wherein said cover is constructed and arranged to hold a second retainer and its disk.

17. The combination retainer and container of claim 15 including spring means which are compressed when said retainer is located in said container, and
    a finger engagable surface located on said retainer to facilitate removal of said retainer from said container.

18. The combination retainer and container of claim 15 wherein said floor member includes a plurality of upstanding spring blades located adjacent the wall of said container, said spring blades being moved to a deflected position when a retainer is located in said container,
    a like plurality of latching ridges carried on the edge of said retainer, one ridge cooperating with one of said spring blades when a retainer is located in said container, and
    a finger engagable surface located in an edge portion of said retainer, to facilitate removal of said retainer from said container.

19. The combination retainer and container of claim 14 including a hinge connecting said cover to the bottom portion of the wall that encircles said floor member, and
    said cover having a wall which encircles said cover and mates with the wall that encircles said floor member, said mating of these walls including offset, overlapping wall portions.

20. The combination retainer and container of claim 14 wherein said cover comprises a second floor member of a size substantially equal to the size of said retainer, and another wall encircling said second floor member, said other wall being made up of top, bottom and side segments, said wall being of a height only somewhat greater than the thickness of said retainer, and openings in the side segments of said other wall, said openings accommodating the offset wall portions of said retainer, such that said disk identification indicia remains visible when a retainer is positioned in said cover, and
   a hinge connecting the the bottom portion of the first mentioned wall to the bottom portion of said another wall.

21. The combination retainer and container of claim 14 wherein said cover and said floor member each include external stacking ridges which are of a complementary dimension such that when one container's floor member is stacked on top of another container's cover, said stacking ridges preventing sideways movement of one container relative to the other, and the stacking ridge of said cover being of a size to hold a retainer therein.

22. The combination retainer and container of claim 14 wherein said cover comprises a second floor member of a size substantially equal to the size of said retainer, and another wall encircling said second floor member, said other wall being made up of top, bottom and side segments, said wall being of a height only somewhat greater than the thickness of said retainer, and openings in the side segments of said other wall, said openings accommodating the offset wall portions of said retainer, such that said disk identification indicia remains visible when a retainer is positioned in said cover,
   a hinge connecting the bottom portion of the first mentioned wall to the bottom portion of said another wall,
   a catch having one portion included in the top portion of the first mentioned wall, and a mating portion included in the top portion of said another wall, and
   stiffening means comprising a short stub wall closely spaced interior of the recited portions of said first mentioned wall and said second wall, and short wall segments connecting said stub wall to the adjacent portions of said first mentioned wall and said second wall.

* * * * *